United States Patent
Hong et al.

(10) Patent No.: US 12,439,430 B2
(45) Date of Patent: Oct. 7, 2025

(54) METHOD AND APPARATUS FOR ALIGNMENT BETWEEN DRX OPERATIONS IN SIDELINK COMMUNICATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Ui Hyun Hong, Hwaseong-si (KR); Gene Back Hahn, Hwaseong-si (KR); Hyuk Min Son, Iksan-si (KR)

(73) Assignees: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

( * ) Notice: Subject to any disclaimer, the term of this patent is extended or adjusted under 35 U.S.C. 154(b) by 76 days.

(21) Appl. No.: 17/921,286

(22) PCT Filed: Apr. 29, 2022

(86) PCT No.: PCT/KR2022/006179
§ 371 (c)(1),
(2) Date: Oct. 25, 2022

(87) PCT Pub. No.: WO2022/235019
PCT Pub. Date: Nov. 10, 2022

(65) Prior Publication Data
US 2024/0224295 A1  Jul. 4, 2024

(30) Foreign Application Priority Data
May 3, 2021 (KR) .................. 10-2021-0057499

(51) Int. Cl.
*H04W 72/25* (2023.01)
*H04L 1/1867* (2023.01)
(Continued)

(52) U.S. Cl.
CPC ............. *H04W 72/25* (2023.01); *H04L 1/188* (2013.01); *H04L 5/0055* (2013.01); *H04W 76/28* (2018.02)

(58) Field of Classification Search
CPC ....... H04W 72/25; H04W 76/28; H04W 4/40; H04W 56/0015; H04W 52/0245;
(Continued)

(56) References Cited

U.S. PATENT DOCUMENTS

2020/0413295 A1  12/2020  Li et al.
2021/0059005 A1*  2/2021  Hosseini ............... H04W 76/28
(Continued)

OTHER PUBLICATIONS

Fujitsu, 'Considerations on partial sensing and DRX in NR sidelink', R1-2102719, 3GPP TSG RAN WG1 Meeting #104bis-e, Apr. 6, 2021; 18pp.
Huawei et al., 'Sidelink resource allocation to reduce power consumption', R1-2102323, 3GPP TSG RAN WG1 Meeting #104bis-e, Apr. 7, 2021; 20pp.
International Search Report issued in related Application No. PCT/KR2022/006179 (6 pages).
(Continued)

*Primary Examiner* — Rina C Pancholi
(74) *Attorney, Agent, or Firm* — Lempia Summerfield Katz LLC

(57) ABSTRACT

A method of a first terminal may comprise: receiving discontinuous reception (DRX) configuration information for a sidelink; performing a reception operation for a physical sidelink control channel (PSCCH) of a second terminal in an inactive time period indicated by the DRX configuration information; and obtaining sidelink control information (SCI) from the PSCCH.

15 Claims, 12 Drawing Sheets

(51) Int. Cl.
*H04L 5/00* (2006.01)
*H04W 76/28* (2018.01)

(58) Field of Classification Search
CPC ......... H04W 52/0235; H04W 52/0216; H04W 76/14; H04W 92/18; H04W 72/121; H04W 72/20; H04L 1/188; H04L 5/0055; H04L 1/1858; H04L 5/0091; H04L 5/0053; H04L 1/1812; H04L 1/1854; Y02D 30/70
See application file for complete search history.

(56) References Cited

U.S. PATENT DOCUMENTS

| | | | | |
|---|---|---|---|---|
| 2022/0015186 A1* | 1/2022 | Jeong | ................... | H04L 1/1896 |
| 2022/0353945 A1* | 11/2022 | Liu | ..................... | H04W 76/28 |
| 2024/0032140 A1* | 1/2024 | Lee | .................. | H04W 52/0216 |

OTHER PUBLICATIONS

LG Electronics, 'Discussion on physical layer design considering sidelink DRX operation', R1-2007897, 3GPP TSG RAN WG1 Meeting #103-e, Nov. 1, 2020; 15pp.

Moderator (ZTE, Sanechips), 'Discussion on [104-e-NR-R17-SL-LS-01]', R1-2102024, 3GPP TSG RAN WG1 Meeting #104-e, Feb. 2, 2021; 7pp.

Samsung, 'On resource allocation for power saving', R1-2103257, 3GPP TSG RAN WG1 Meeting #104bis-e, Apr. 7, 2021; 15pp.

Intel Corporation, On general sidelink DRX design, R2-2100622, 3GPP TSG RAN WG2 Meeting #113-e Electronic meeting, Jan. 25-Feb. 5, 2021, 4pp.

Interdigital, Stage 2 Running CR of TS 38.300 for eSL, R2-2108496, 3GPP TSG-RAN WG2 Meeting #115 Electronic Online Meeting, Aug. 2021, 13pp.

Lenovo, Motorola Mobility, Discussion on SL DRX for unicast, R2-2103401, 3GPP TSG-RAN WG2 Meeting #113 bis electronic Online, Apr. 12-Apr. 20, 2021, 7pp.

* cited by examiner

METHOD AND APPARATUS FOR ALIGNMENT BETWEEN DRX OPERATIONS IN SIDELINK COMMUNICATION

CROSS-REFERENCE TO RELATED APPLICATIONS

This application is a U.S. national stage of International Application No. PCT/KR2022/006179, filed on Apr. 29, 2022, which claims priority to Korean Patent Application No. KR2021-0057499 filed on May 3, 2021, the entire disclosures of which are incorporated by reference herein in its entirety.

TECHNICAL FIELD

The present disclosure relates to a sidelink discontinuous reception (SL DRX) technique, and more particularly, to a technique for alignment between DRX operations for a plurality of receiving terminals.

BACKGROUND

A fifth-generation (5G) communication system (e.g., New Radio (NR) communication system), which uses a frequency band higher than a frequency band of a fourth-generation (4G) communication system (e.g., Long Term Evolution (LTE) communication system or LTE-Advanced (LTE-A) communication system) as well as the frequency band of the 4G communication system, has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink communication may support discontinuous reception (DRX) operations. One transmitting terminal may perform sidelink communication with a plurality of receiving terminals, and each of the plurality of receiving terminals may perform a DRX operation (e.g., sidelink (SL) DRX operation). When DRX operations for the plurality of receiving terminals are not aligned, sidelink communication may be performed inefficiently.

SUMMARY

An objective of the present disclosure for solving the above-described problem is to provide a method and an apparatus for alignment between sidelink discontinuous reception (SL DRX) operations for a plurality of receiving terminals.

Technical Solution

An operation method of a first terminal, according to a first embodiment of the present disclosure for achieving the objective, may comprise: receiving discontinuous reception (DRX) configuration information for a sidelink; performing a reception operation for a physical sidelink control channel (PSCCH) of a second terminal in an inactive time period indicated by the DRX configuration information; and obtaining sidelink control information (SCI) from the PSCCH.

The SCI may include DRX synchronization information, and the DRX synchronization information may include information on a DRX cycle and a time offset indicating a start time of the DRX cycle.

The method may further comprise performing a DRX operation according to the DRX cycle at the start time indicated by the DRX synchronization information.

The DRX cycle may start after the time offset from a reception time of the PSCCH, an end time of a slot in which the PSCCH is received, or an end time of the inactive time period in which the PSCCH is received.

A plurality of time offsets may be configured by higher layer signaling or system information, and the DRX synchronization information may indicate one time offset among the plurality of time offsets.

The time offset may be set user equipment (UE)-specifically, group-specifically, or sidelink (SL)-specifically.

The method may further comprise: performing a reception operation for a physical sidelink shared channel (PSSCH) associated with the PSCCH; and transmitting a hybrid automatic repeat request-acknowledgement (HARQ-ACK) for the PSSCH to the second terminal.

The reception operation for the PSSCH and the transmission operation of the HARQ-ACK may be performed within the inactive time period.

The SCI may include information indicating an SCI type, and the SCI type may be classified into an SCI type 1-A for scheduling data transmission and an SCI type 1-B for signaling DRX synchronization information.

A first terminal according to a second embodiment of the present disclosure for achieving the objective may comprise: a processor; and a memory storing one or more instructions executable by the processor. The one or more instructions are executed to: receive discontinuous reception (DRX) configuration information for a sidelink; perform a reception operation for a physical sidelink control channel (PSCCH) of a second terminal in an inactive time period indicated by the DRX configuration information; and obtain sidelink control information (SCI) from the PSCCH.

The SCI may include DRX synchronization information, and the DRX synchronization information may include information on a DRX cycle and a time offset indicating a start time of the DRX cycle.

The one or more instructions may be further executed to perform a DRX operation according to the DRX cycle at the start time indicated by the DRX synchronization information.

The DRX cycle may start after the time offset from a reception time of the PSCCH, an end time of a slot in which the PSCCH is received, or an end time of the inactive time period in which the PSCCH is received.

A plurality of time offsets may be configured by higher layer signaling or system information, and the DRX synchronization information may indicate one time offset among the plurality of time offsets.

The time offset may be set user equipment (UE)-specifically, group-specifically, or sidelink (SL)-specifically.

The one or more instructions may be further executed to: perform a reception operation for a physical sidelink shared channel (PSSCH) associated with the PSCCH; and transmit a hybrid automatic repeat request-acknowledgement (HARQ-ACK) for the PSSCH to the second terminal.

The reception operation for the PSSCH and the transmission operation of the HARQ-ACK may be performed within the inactive time period.

The SCI may include information indicating an SCI type, and the SCI type may be classified into an SCI type 1-A for scheduling data transmission and an SCI type 1-B for signaling DRX synchronization information.

Advantageous Effects

According to embodiments of the present disclosure, a transmitting terminal may transmit SCI including DRX synchronization information to receiving terminal(s). The receiving terminal(s) may receive the DRX synchronization information from the transmitting terminal and may identify a timing of a DRX cycle based on the DRX synchronization information. The receiving terminal(s) may perform DRX operation(s) according to the DRX cycle at the identified timing. In this case, the DRX operations in the plurality of receiving terminals may be aligned, and sidelink communication can be efficiently performed.

DETAILED DESCRIPTION

Figure 1:
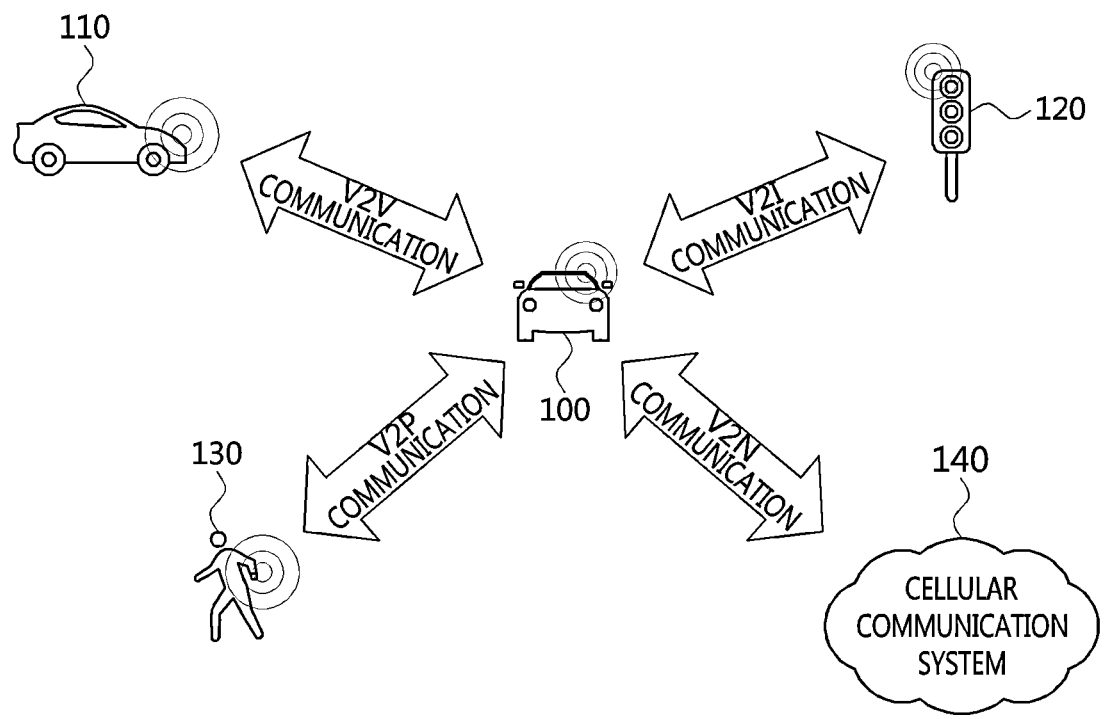
FIG. 1 is a conceptual diagram illustrating Vehicle-to-Everything (V2X) communication scenarios.

While the present disclosure may be amended with various modifications and alternative forms, specific embodiments are shown by way of example in the drawings and described in detail. It should be understood, however, that the description is not intended to limit the present disclosure to the specific embodiments. On the contrary, the present disclosure is intended to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed as a second element, and a second element could be termed as a first element, without departing from the scope of the present disclosure. The term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to limit the present disclosure to embodiments of the present disclosure. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, parts, and/or combinations thereof. However, these terms do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It should be further understood that terms defined in commonly used dictionaries should be interpreted as having a meaning that is consistent with their meanings in the context of the related art and should not be interpreted in an idealized or overly formal sense unless expressly so defined herein.

Hereinafter, embodiments of the present disclosure are described in detail with reference to the accompanying drawings. In describing the present disclosure, to facilitate the entire understanding, like numbers refer to like elements throughout the description of the figures and the repetitive description thereof has been omitted.

FIG. 1 is a conceptual diagram illustrating Vehicle-to-Everything (V2X) communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light, which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., Proximity-based Services (ProSe) and Device-to-Device (D2D) communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology, which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
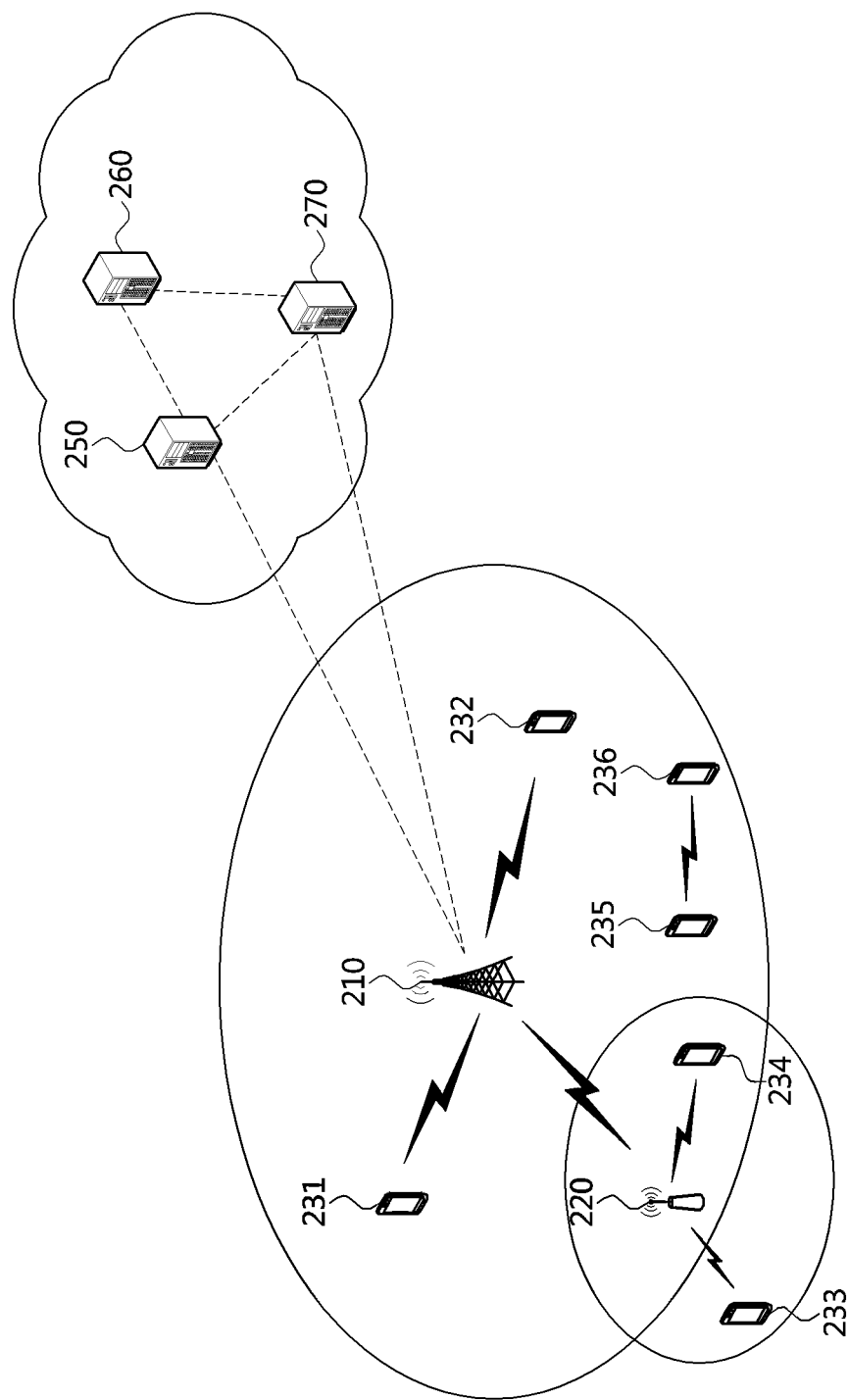
FIG. 2 is a conceptual diagram illustrating an embodiment of a cellular communication system.

FIG. 2 is a conceptual diagram illustrating an embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
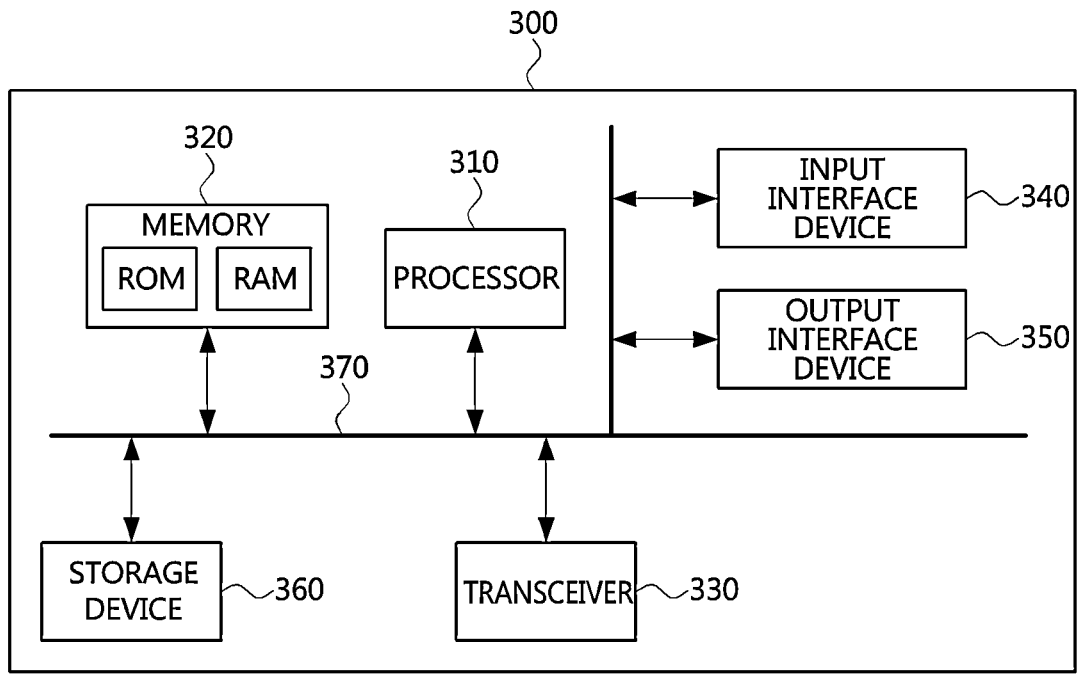
FIG. 3 is a conceptual diagram illustrating an embodiment of a communication node constituting a cellular communication system.

FIG. 3 is a conceptual diagram illustrating an embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, or the storage device 360 via a dedicated interface.

The processor 310 may execute at least one instruction stored in at least one of the memory 320 or the storage device 360. The processor 310 may refer to a central processing unit (CPU), a graphics processing unit (GPU), or a dedicated processor on which methods in accordance with embodiments of the present disclosure are performed. Each of the memory 320 or the storage device 360 may include at least one of a volatile storage medium and a non-volatile storage medium. For example, the memory 320 may comprise at least one of read-only memory (ROM) or random access memory (RAM).

Referring again to FIG. 2, in the communication system, the base station 210 may form a macro cell or a small cell and may be connected to the core network via an ideal backhaul or a non-ideal backhaul. The base station 210 may transmit signals received from the core network to the UEs 231 through 236 and the relay 220 and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. In other words, the relay 220 may transmit signals received from the base station 210 to the UEs 233 and 234 and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |

TABLE 1-continued

| Sidelink Communication Scenario | Position of UE 235 | Position of UE 236 |
| --- | --- | --- |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
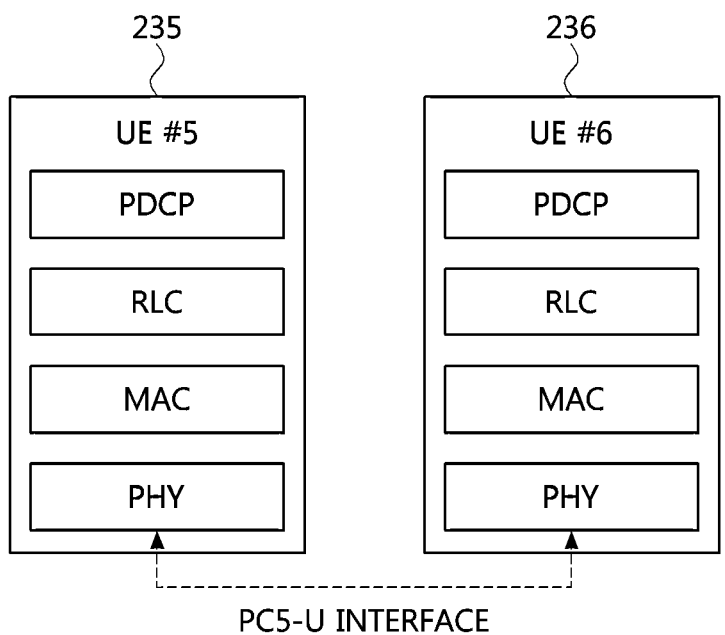
FIG. 4 is a block diagram illustrating an embodiment of a user plane protocol stack of a user equipment (UE) performing sidelink communication.

FIG. 4 is a block diagram illustrating an embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
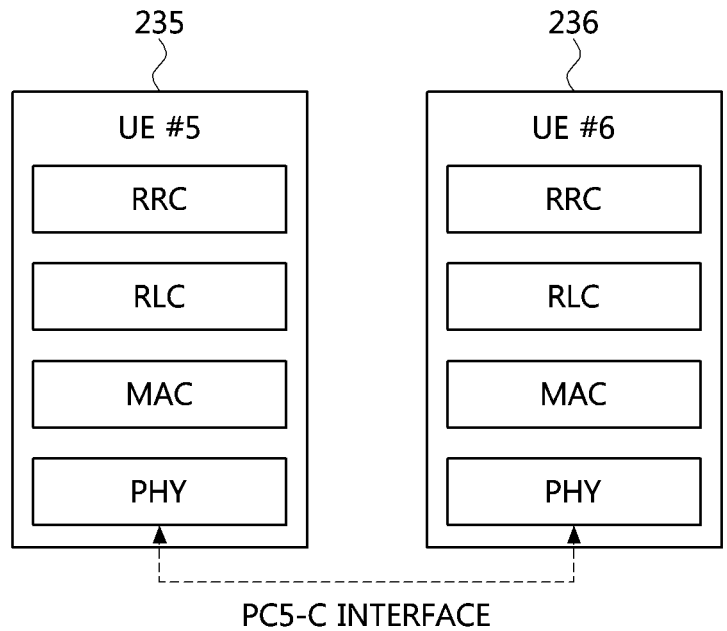
FIG. 5 is a block diagram illustrating a first embodiment of a control plane protocol stack of a UE performing sidelink communication.
Figure 6:
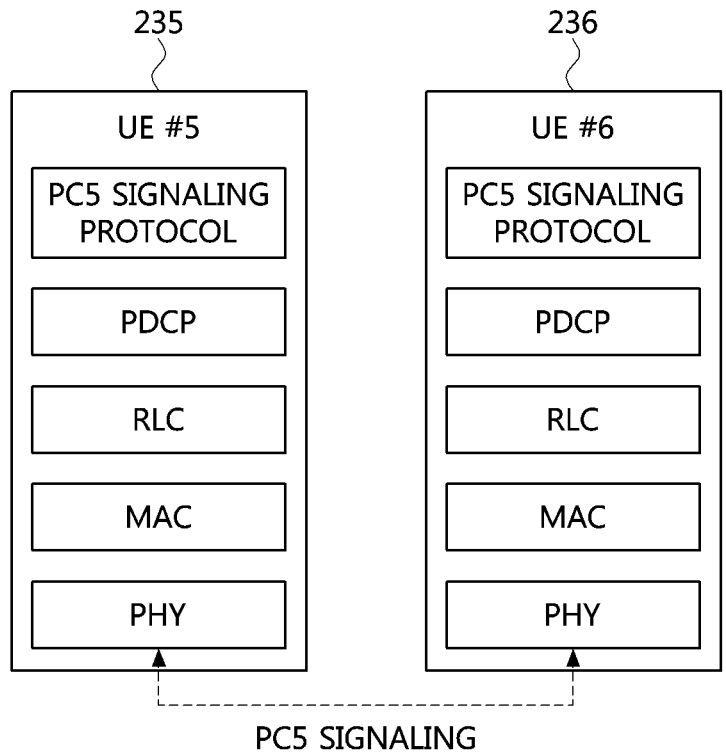
FIG. 6 is a block diagram illustrating a second embodiment of a control plane protocol stack of a UE performing sidelink communication.

FIG. 5 is a block diagram illustrating a first embodiment of a control plane protocol stack of a UE performing sidelink communication, and FIG. 6 is a block diagram illustrating a second embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods are described. Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In embodiments described below, an operation of a vehicle may be an operation of a communication node located in the vehicle.

In embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A first-stage SCI format may include an SCI format 1-A, and a second-stage SCI format may include an SCI format 2-A, an SCI format 2-B, and an SCI format 2-C.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements. The SCI format 2-C may be used for decoding of the PSSCH and/or providing inter-UE coordination information.

In embodiments, "an operation (e.g., transmission operation) is configured" may mean that configuration information (e.g., information element(s), parameter(s)) for the corresponding operation and/or information indicating to perform the corresponding operation are signaled. "An information element (e.g., parameter) is configured" may mean that the corresponding information element is signaled. The signaling may be at least one of system information (SI) signaling (e.g., transmission of a system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or combinations thereof. Here, the MAC CE signaling operation may be performed through a data channel, the PHY signaling operation may be performed through a control channel or a data channel, and transmission of an SCI may mean transmission of a first-stage SCI and/or a second-stage SCI.

Meanwhile, sidelink communication may support a discontinuous reception (DRX) operation. A terminal (e.g., transmitting terminal and/or receiving terminal) operating in an RRC connected state, an RRC inactive state, or an RRC idle state may perform a DRX operation. The DRX operation may be supported by a MAC layer and/or PHY layer of the terminal. The transmitting terminal may refer to a terminal transmitting data (e.g., sidelink (SL) data), and the receiving terminal may refer to a terminal receiving the data (e.g., SL data). When the DRX operation is used, the receiving terminal may operate according to a DRX cycle. The DRX cycle may include an on-duration and an off-duration. In an embodiment, the on-duration may be referred to as an on-duration period, an active time, or an active time period, and the off-duration may be referred to as an off-duration period, an inactive time, or an inactive time period. The receiving terminal may operate in an on state (e.g., wake-up state) in the on-duration period within the DRX cycle. In other words, the receiving terminal may perform a reception operation and/or transmission operation in the on-duration period. The receiving terminal may operate in an off state (e.g., sleep state, idle state, or inactive state) in the off-duration period within the DRX cycle. In other words, the receiving terminal may not perform a reception operation and/or transmission operation in the off-duration period.

DRX configuration information may include at least one of information on a DRX cycle, information on an inactive timer, information on a DRX synchronization time-offset, information on an on-duration, information on an off-duration, or combinations thereof. The DRX configuration information may be signaled from a communication node (e.g., base station and/or transmitting terminal) to the transmitting terminal and/or receiving terminal. The transmitting terminal may attempt data transmission in the on-duration period based on the DRX configuration information configured to the receiving terminal(s). The data transmission may be performed based on a unicast scheme, a groupcast scheme, a multicast scheme, or a broadcast scheme.

One transmitting terminal may perform sidelink communication with a plurality of receiving terminals. The plurality of receiving terminals may perform DRX operations based on different DRX configuration information. In this case, it may be impossible for the transmitting terminal to simultaneously transmit a wake-up signal or a paging signal to the plurality of receiving terminals. For example, when the transmitting terminal transmits a common message for public safety to the plurality of receiving terminals operating based on different DRX configuration information, a wake-up signal or a paging signal may be repeatedly transmitted in active time periods (e.g., on-duration periods) of the respective plurality of receiving terminals. In this case, the sidelink communication may be performed inefficiently. In addition, when the receiving terminals participating in groupcast communication start the DRX operations at different timings, a wake-up signal or a paging signal may be transmitted in the active time periods (e.g., on-duration periods) of the respective plurality of receiving terminals. In this case, the sidelink communication may be performed inefficiently.

Signaling overhead may increase due to the repeated transmissions of the signal, and repeated transmissions of a PSSCH (e.g., data) associated with the corresponding signal may be caused. Efficiency in using resources (e.g., time and/or frequency resources) may be reduced by the repeated transmissions, and power consumption may increase in the transmitting terminal performing the repeated transmissions. The transmitting terminal may transmit the signals (e.g., wake-up signals or paging signals) at different timings, and the respective receiving terminals may stop the DRX operations based on the signals received at different timings. After the DRX operation is stopped, each of the receiving terminals may perform a transition operation to a state for continuous data reception at a different timing. When the receiving terminals are restricted to terminating the DRX operations at the same time, data reception operations of some receiving terminals after receiving the wake-up signal or paging signal may be delayed for synchronization with other receiving terminals. In order to solve the above-mentioned problem, methods for synchronizing DRX cycles (e.g., timings of the DRX cycles) or acquiring DRX synchronization for the plurality of receiving terminals are required.

An inactive timer for the DRX operation may be configured in each of the terminals (e.g., transmitting terminal and/or receiving terminals). When a data transmission/reception operation between a transmitting terminal and a receiving terminal is not performed before the inactive timer expires, the receiving terminal may perform the DRX operation. In other words, when the inactive timer expires, the receiving terminal may perform the DRX operation. Also, when the inactive timer expires, the transmitting terminal may determine that the receiving terminal performs the DRX operation. When the DRX operation is performed, the receiving terminal may perform a reception operation in the active time period (e.g., on-duration period) and may not perform a reception operation in the inactive time period (e.g., off-duration period). The receiving terminal may perform a reception operation for a control signal (e.g., PSCCH, SCI) in the active time period. When specific condition(s) is satisfied, the receiving terminal may perform a reception operation and/or measurement operation even in the inactive time period.

A start time of the inactive timer may be a transmission/reception time of the last data between the transmitting terminal and the receiving terminal (e.g., decoding time of the last data). Alternatively, the start time of the inactive timer may be a time after a time-offset from the transmission/reception time of the last data between the transmitting terminal and the receiving terminal. Information on the time-offset may be included in the DRX configuration information. When a transmission/reception operation of data (e.g., new data) is performed before the inactive timer expires, the inactive timer may be initialized.

A value of the inactive timer may be set by higher layer signaling or system information. In the communication system, the value of the inactive timer may be set or operated as one value. The value of the inactive timer may be set or operated UE-specifically, SL-specifically, groupcast-specifically, or broadcast-specifically. The DRX configuration information may include information on the DRX cycle, and the information on the DRX cycle may mean periodicity values for the active time period and the inactive time period. The DRX configuration information may be configured by higher layer signaling or system information.

Figure 7:
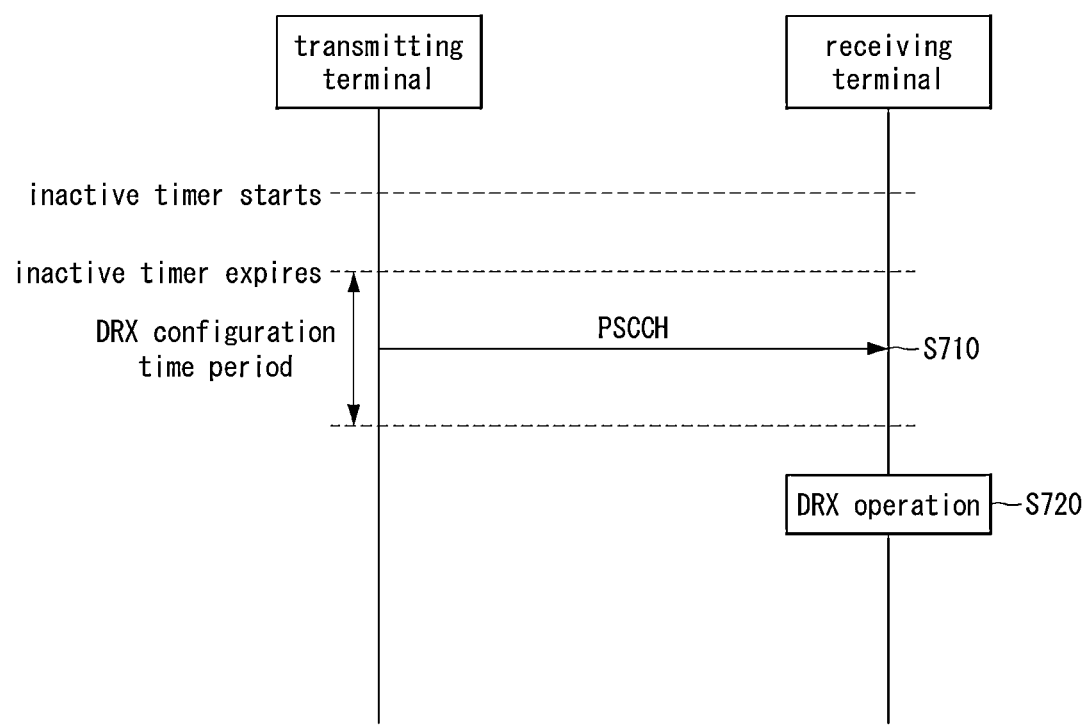
FIG. 7 is a sequence chart illustrating a first embodiment of a method for configuring discontinuous reception (DRX) synchronization in a communication system.

FIG. 7 is a sequence chart illustrating a first embodiment of a method for configuring DRX synchronization in a communication system.

As shown in FIG. 7, a communication system may include a transmitting terminal and a receiving terminal. The transmitting terminal and/or receiving terminal may start an inactive timer. If a transmission or reception operation of data between the transmitting terminal and the receiving terminal is not performed before the inactive timer expires, the receiving terminal performs a reception operation for a PSCCH to receive DRX synchronization information within a DRX configuration time period. The DRX synchronization information may include some information elements among information elements included in the DRX configuration information configured by higher layer signaling. For example, the DRX synchronization information may include information on a DRX cycle and/or information on a DRX synchronization time-offset. The DRX synchronization information may be used to change, modify, or update information element(s) included in preconfigured DRX configuration information.

The DRX synchronization may refer to timing information of the DRX cycle (e.g., a start time and/or end time of the DRX cycle). The DRX configuration time period may start after the inactive timer expires. The DRX configuration time period may be configured based on at least one of system information, higher layer signaling, SCI, combinations thereof. For example, information on the DRX configuration time period may be included in the DRX configuration information. The transmitting terminal may transmit the DRX synchronization information in the DRX configuration time period (S710). The DRX synchronization information may be transmitted on a PSCCH. An operation of transmitting the PSCCH may be performed for DRX synchronization, updating the DRX configuration information, changing the DRX configuration information, and/or reconfiguring the DRX configuration information.

The DRX synchronization information may be explicitly or implicitly indicated by an SCI. For example, the DRX synchronization information may be explicitly indicated by information element(s) included in a first-stage SCI. The DRX synchronization information may be implicitly indicated by a transmission resource (e.g., time resource, frequency resource, reception timing, scrambling sequence, and/or radio network temporary identifier (RNTI)) of a PSCCH (e.g., SCI). The scrambling sequence may be indicated by a scrambling ID.

The receiving terminal may receive the PSCCH (e.g., SCI) from the transmitting terminal and may identify the DRX synchronization information explicitly or implicitly indicated by the PSCCH. The receiving terminal may perform a DRX operation based on the DRX synchronization information (S720). The DRX operation based on the DRX synchronization information may mean a DRX operation based on the DRX configuration information indicated by higher layer signaling and the DRX synchronization information indicated by the SCI. Some of information elements included in the DRX configuration information (e.g., timing of the DRX cycle) may be updated by the DRX synchronization information, and the receiving terminal may perform the DRX operation based on the information element(s) included in the DRX configuration information and the information element(s) updated by the DRX synchronization information.

The SCI for signaling of DRX synchronization information may be configured to be distinguished from other SCIs (e.g., SCI for scheduling SL data). The SCI for signaling of DRX synchronization information may be referred to as a DRX synchronization SCI. An SCI for purposes other than signaling of DRX synchronization information (e.g., scheduling of SL data) may be referred to as a normal SCI.

The SCI type (e.g., DRX synchronization SCI or normal SCI) may be explicitly or implicitly indicated by the SCI. The normal SCI may be referred to as an SCI type 1-A, and the DRX synchronization SCI may be referred to as an SCI type 1-B. The SCI type 1-A and the SCI type 1-B may be scrambled by different RNTIs. In other words, the SCI type 1-A and the SCI type 1-B may be distinguished by the RNTIs. The SCI type may mean an SCI format. For example, the SCI may include an information element indicating the SCI type. Alternatively, the SCI type may be implicitly indicated by a transmission resource (e.g., time resource (e.g., time resource index), frequency resource (e.g., frequency resource index), scrambling sequence, and/or RNTI) of the SCI. The SCI type may be implicitly indicated by an ID used for masking or scrambling for the SCI. The ID may be a cast type-related ID, an ID of the transmitting terminal, an ID of the receiving terminal, an ID indicating new DRX configuration information (e.g., new DRX synchronization information), and/or the like. The cast type may indicate broadcast, groupcast, or unicast. The SCI type may be indicated by a combination of the above-described schemes.

The transmitting terminal may not transmit the PSCCH (e.g., SCI). For example, when transmission of the DRX synchronization information is not required, the transmitting terminal may not transmit the SCI indicating the DRX synchronization information. If a PSCCH (e.g., SCI including the DRX synchronization information) is not received from the transmitting terminal within the DRX configuration time period, the receiving terminal may perform a DRX operation based on preconfigured DRX configuration information (e.g., DRX cycle).

Figure 8:
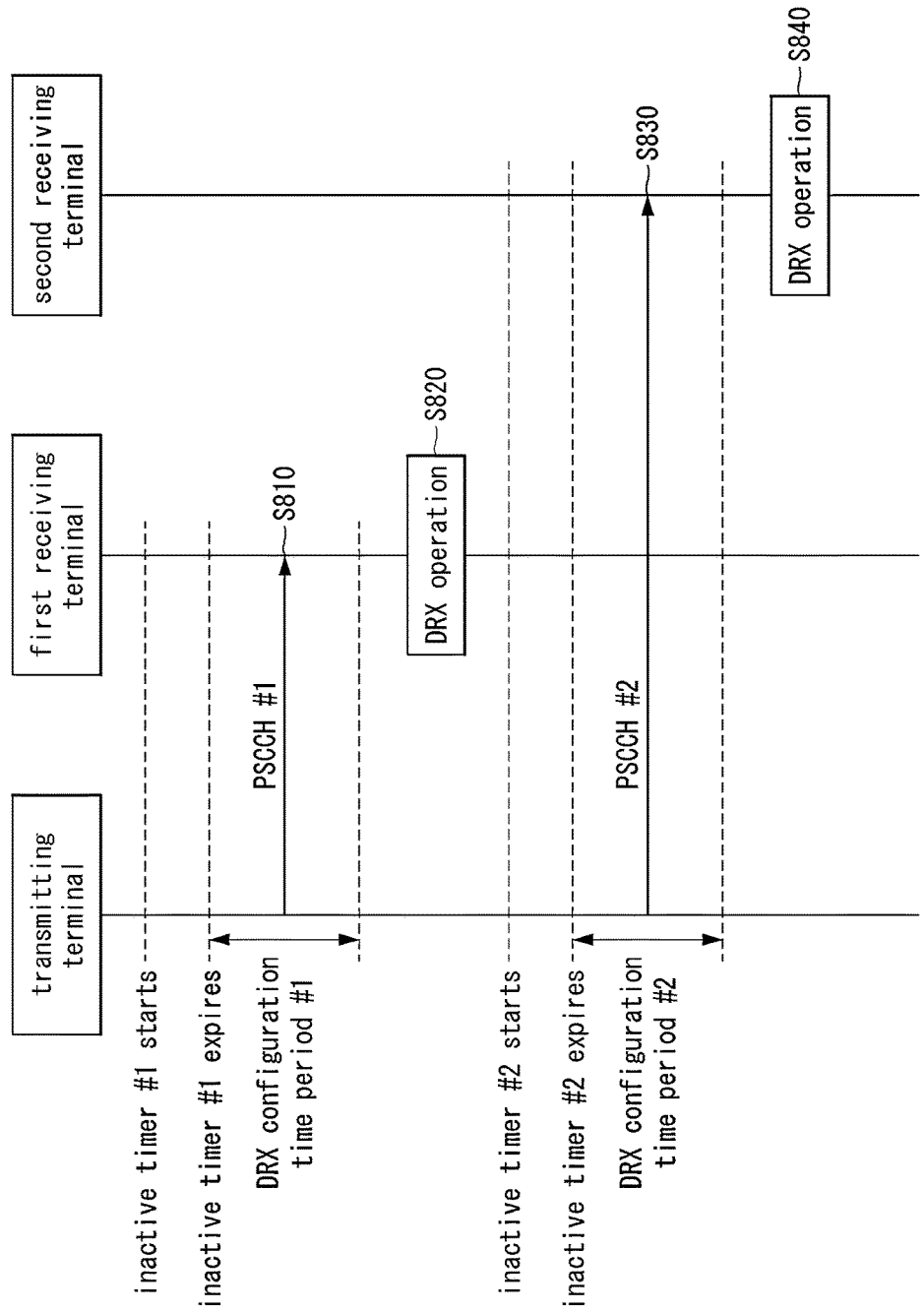
FIG. 8 is a sequence chart illustrating a second embodiment of a method for configuring DRX synchronization in a communication system.

FIG. 8 is a sequence chart illustrating a second embodiment of a method for configuring DRX synchronization in a communication system.

As shown in FIG. 8, a communication system may include a transmitting terminal, a first receiving terminal, and a second receiving terminal. The embodiment of FIG. 8 may be applied to a procedure for configuring DRX synchronization between the transmitting terminal and the plurality of receiving terminals. The transmitting terminal and/or the first receiving terminal may start an inactive timer #1. When a data transmission/reception operation between the transmitting terminal and the first receiving terminal is not performed before the inactive timer #1 expires, the first receiving terminal may perform a reception operation for a PSCCH #1 in order to receive DRX synchronization information within a DRX configuration time period #1. The DRX configuration time period #1 may be started after the inactive timer #1 expires. The transmitting terminal may transmit DRX synchronization information within the DRX configuration time period #1 (S810). The DRX synchronization information may be transmitted on the PSCCH #1. When the PSCCH #1 (e.g., SCI including the DRX synchronization information) is received from the transmitting terminal within the DRX configuration time period #1, the first receiving terminal may perform a DRX operation based on the DRX synchronization information (S820). If the PSCCH #1 is not received within the DRX configuration time period #1, the first receiving terminal may perform a DRX operation based on preconfigured DRX configuration information.

Meanwhile, the transmitting terminal and/or the second receiving terminal may start an inactive timer #2. When a data transmission/reception operation between the transmitting terminal and the second receiving terminal is not performed before the inactive timer #2 expires, the second receiving terminal may perform a reception operation for a PSCCH #2 in order to receive DRX synchronization information within a DRX configuration time period #2. The DRX configuration time period #2 may be started after the inactive timer #2 expires. The transmitting terminal may transmit DRX synchronization information within the DRX configuration time period #2 (S830). The DRX synchronization information may be transmitted on the PSCCH #2. When the PSCCH #2 (e.g., SCI including the DRX synchronization information) is received from the transmitting terminal within the DRX configuration time period #2, the second receiving terminal may perform a DRX operation based on the DRX synchronization information (S840). When the PSCCH #2 is not received within the DRX configuration time period #2, the second receiving terminal may perform a DRX operation based on preconfigured DRX configuration information.

The DRX configuration time period #1 and the DRX configuration time period #2 may be configured with different values. Alternatively, the DRX configuration time period #1 and the DRX configuration time period #2 may be configured with the same values. The DRX synchronization information included in the PSCCH #1 may indicate information for acquiring DRX synchronization with another receiving terminal (e.g., second receiving terminal) performing the DRX operation. If a receiving terminal performing a DRX operation does not exist among the receiving terminals performing sidelink communication with the transmitting terminal, the transmitting terminal may not transmit the PSCCH #1. The first receiving terminal may perform a DRX operation based on preconfigured DRX configuration information. The PSCCH #2 may indicate information for acquiring DRX synchronization with the first receiving terminal.

The embodiment of FIG. 8 may be applied to a scenario in which a first unicast communication between the transmitting terminal and the first receiving terminal and a second unicast communication (i.e., unicast communication different from the first unicast communication) between the transmitting terminal and the second receiving terminal are performed. The embodiment of FIG. 8 may also be applied to a scenario in a first groupcast communication between the transmitting terminal and the first receiving terminal and a second groupcast communication (i.e., groupcast communication different from the first groupcast communication between the transmitting terminal and the second receiving terminal) are performed. The embodiment of FIG. 8 may also be applied to a scenario in which a unicast communication between the transmitting terminal and the first receiving terminal and a groupcast communication between the transmitting terminal and the second receiving terminal are performed. The embodiment of FIG. 8 may also be applied to a scenario in which a groupcast communication between the transmitting terminal and the first receiving terminal and a unicast communication between the transmitting terminal and the second receiving terminal are performed.

Terminals performing groupcast communication may mean all terminals in a groupcast group. For example, when the second receiving terminal performs groupcast communication, operations of the second receiving terminal may be interpreted as operations of all receiving terminals belonging to a group for the corresponding groupcast communication. The embodiment of FIG. 8 may be applied to a scenario in which the first receiving terminal and the second receiving terminal belong to the same groupcast group. When receiving terminals belonging to the same groupcast group have different inactive timers and/or different DRX configuration time periods, DRX synchronization between the receiving terminals may be acquired based on the embodiment of FIG. 7.

Figure 9:
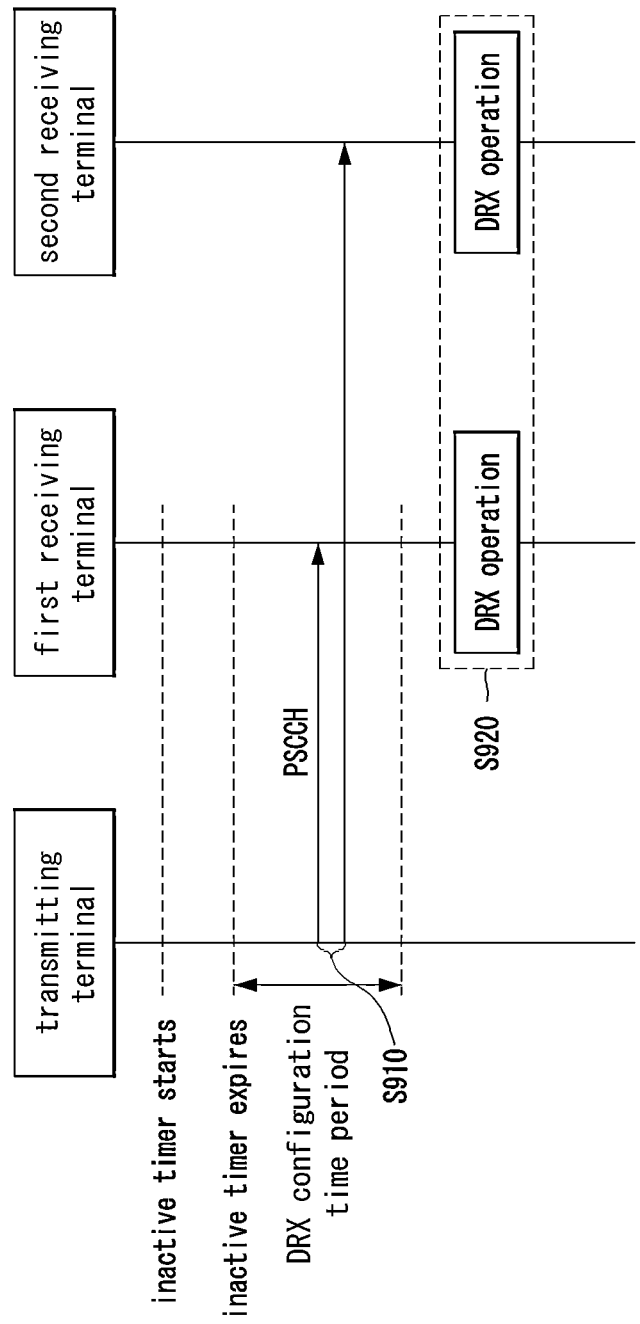
FIG. 9 is a sequence chart illustrating a third embodiment of a method for configuring DRX synchronization in a communication system.

FIG. 9 is a sequence chart illustrating a third embodiment of a method for configuring DRX synchronization in a communication system.

As shown in FIG. 9, a communication system may include a transmitting terminal, a first receiving terminal, and a second receiving terminal. The transmitting terminal may perform groupcast communication or broadcast communication with the first receiving terminal and the second receiving terminal. During the groupcast communication or broadcast communication, the first receiving terminal and/or the second receiving terminal may perform a DRX operation. Each of the transmitting terminal, the first receiving terminal, and the second receiving terminal may start an inactive timer. A DRX configuration time period may start after the inactive timer expires.

The transmitting terminal may transmit one PSCCH (e.g., SCI including DRX synchronization information) in order to acquire DRX synchronization between the plurality of receiving terminals (e.g., the first receiving terminal and the second receiving terminal) (S910). The PSCCH may be transmitted within the DRX configuration time period. The PSCCH may be used to acquire DRX synchronization with receiving terminal(s) that have entered DRX during sidelink communication with the transmitting terminal. The first receiving terminal and/or the second receiving terminal may receive the PSCCH from the transmitting terminal and may perform a DRX operation based on the DRX synchronization information indicated by the PSCCH (S920). The step S920 may be performed when the PSCCH is received within the DRX configuration time period. When the PSCCH is not received within the DRX configuration time period, the first receiving terminal and/or the second receiving terminal may perform a DRX operation based on preconfigured DRX configuration information.

The embodiment(s) of FIGS. 7, 8, and/or 9 may be performed to acquire DRX synchronization for all receiving terminals (or all sidelinks) connected to one transmitting terminal. Alternatively, the embodiment(s) of FIGS. 7, 8, and/or 9 may be performed to acquire DRX synchronization for specific receiving terminal(s) (e.g., specific sidelink(s)) connected to one transmitting terminal.

Figure 10:
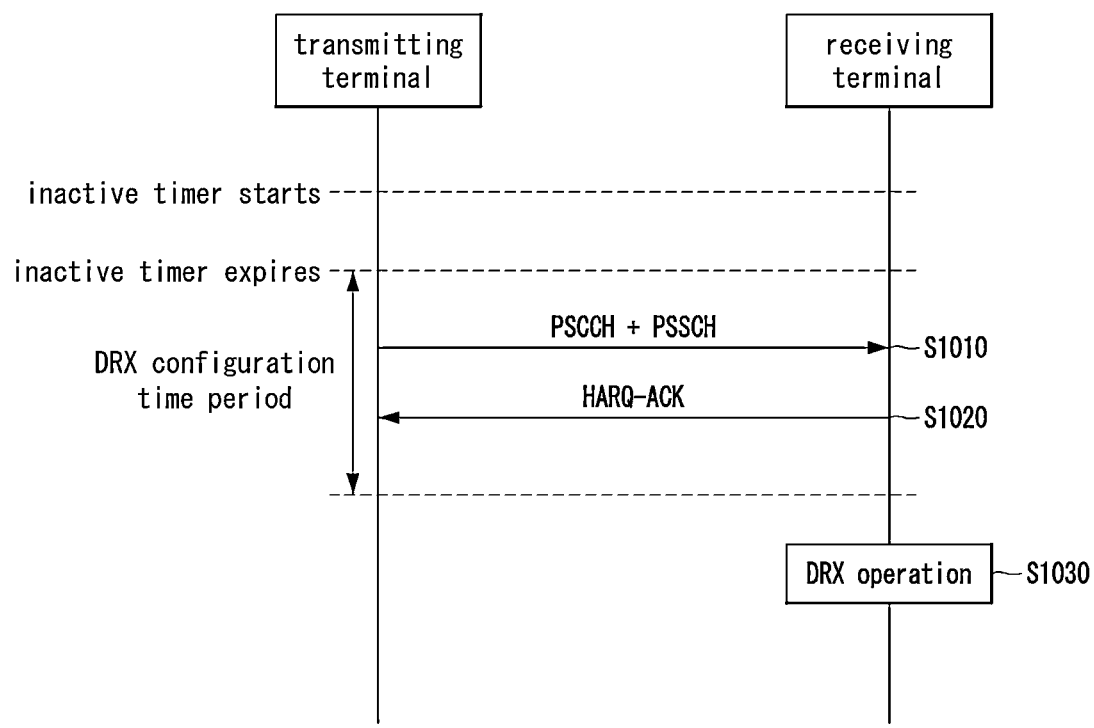
FIG. 10 is a sequence chart illustrating a fourth embodiment of a method for configuring DRX synchronization in a communication system.

FIG. 10 is a sequence chart illustrating a fourth embodiment of a method for configuring DRX synchronization in a communication system.

As shown in FIG. 10, a communication system may include a transmitting terminal and a receiving terminal. The transmitting terminal and/or the receiving terminal may start an inactive timer. If a transmission or reception operation of data between the transmitting terminal and the receiving terminal is not performed before the inactive timer expires, the receiving terminal may perform a reception operation for a PSCCH and/or a PSSCH to receive DRX synchronization information within a DRX configuration time period. The DRX configuration time period may start after the inactive timer expires. The transmitting terminal may transmit the DRX synchronization information within the DRX configuration time period (S1010).

The transmitting terminal may transmit the PSCCH and the PSSCH for signaling of the DRX synchronization information. The DRX synchronization information may be implicitly or explicitly indicated by a transmission resource (e.g., time resource, frequency resource, scrambling sequence, RNTI) of the PSCCH, information element(s) included in a first-stage SCI, information element(s) included in a second-stage SCI, and/or data (e.g., MAC CE, piggyback) transmitted through the PSSCH. An SCI type (e.g., DRX synchronization SCI or normal SCI) may be implicitly or explicitly indicated by the first-stage SCI and/or the second-stage SCI. For example, the SCI may include an information element indicating the SCI type.

Alternatively, the SCI type may be indicated by implicitly a transmission resource (e.g., time resource (e.g., time resource index), frequency resource (e.g., frequency resource index), scrambling sequence, and/or RNTI) of the SCI. The transmission resource of the SCI may be a transmission resource of the PSCCH and/or the PSSCH on which the SCI is transmitted. The SCI type may be implicitly indicated by an ID used for masking or scrambling for the SCI. The ID may be a cast type-related ID, an ID of the transmitting terminal, an ID of the receiving terminal, an ID indicating new DRX configuration information (e.g., new DRX synchronization information), and/or the like. The cast type may indicate broadcast, groupcast, or unicast. The SCI type may be indicated by a combination of the above-described schemes.

The receiving terminal may receive the PSCCH and the PSSCH from the transmitting terminal and may obtain the DRX synchronization information from the PSCCH and/or the PSSCH. The receiving terminal may transmit a HARQ-ACK (e.g., acknowledgment (ACK) or negative ACK (NACK)) for the PSCCH and/or the PSSCH to the transmitting terminal (S1020). The receiving terminal may transmit the HARQ-ACK to the transmitting terminal within the DRX configuration time period. The transmitting terminal may receive the HARQ-ACK (e.g., ACK or NACK) for the PSCCH and/or the PSSCH from the receiving terminal. The transmitting terminal may check whether the DRX synchronization information has been successfully received by the receiving terminal based on the HARQ-ACK. Accordingly, ambiguity caused by a reception failure of the DRX synchronization information in the receiving terminal may be resolved.

The receiving terminal may perform a DRX operation based on the DRX synchronization information received from the transmitting terminal (S1030). If the DRX synchronization information is not received from the transmitting terminal within the DRX configuration time period, the receiving terminal may perform a DRX operation based on preconfigured DRX configuration information.

The embodiment of FIG. 10 (e.g., HARQ-ACK feedback operation) may be applied to the embodiment(s) of FIGS. 8 and/or 9. When the embodiment of FIG. 10 is applied to the embodiment of FIG. 9, the receiving terminals may transmit HARQ-ACKs to the transmitting terminal in a groupcast scheme. In the embodiment(s) of FIGS. 7-10, the DRX synchronization information may be explicitly indicated by the PSCCH and/or the PSSCH. In this case, the PSCCH and/or the PSSCH may include indication bits defined in Table 3 below. The indication bits may indicate the DRX synchronization information (e.g., DRX cycle and DRX synchronization time-offset).

TABLE 3

| Indication bits | DRX synchronization information | |
|---|---|---|
| | DRX cycle | DRX synchronization time-offset |
| 00 | Cycle #1 | X1 slots |
| 01 | Cycle #2 | X2 slots |
| 10 | Cycle #3 | X3 slots |
| 11 | Cycle #4 | X4 slots |

Table 3 may be preconfigured in terminals (e.g., transmitting terminal and receiving terminals) by higher layer signaling or system information. For example, the base station may signal configuration information of Table 3 to the terminals. When Table 3 is configured, the indication bits indicating the DRX synchronization information may be transmitted on a PSCCH and/or a PSSCH. The DRX synchronization time-offset may be an offset between a reception time of the PSCCH or PSSCH and a start time of a DRX operation. For example, if the PSCCH or PSSCH is received in a slot #X and the indication bits are set to 01, the receiving terminal may perform the DRX operation in a slot #(X+X2). Each of X, X1, X2, X3, and X4 may be a natural number.

In Table 3, the DRX synchronization information may include only one information element among the DRX cycle and the DRX synchronization time-offset. In this case, the indication bits may indicate only the DRX cycle. Alternatively, the indication bits may indicate only the DRX synchronization time-offset. Alternatively, the DRX synchronization information in Table 3 may include a plurality of information elements. In this case, the indication bits may indicate the plurality of information elements included in the DRX synchronization information. The DRX synchronization time-offset may be set in units of slots, subframes, symbols, or absolute time. The configuration unit (or configuration value) of the DRX cycle and/or DRX synchronization time-offset may be directly indicated by the PSCCH or the PSSCH.

Figure 11:
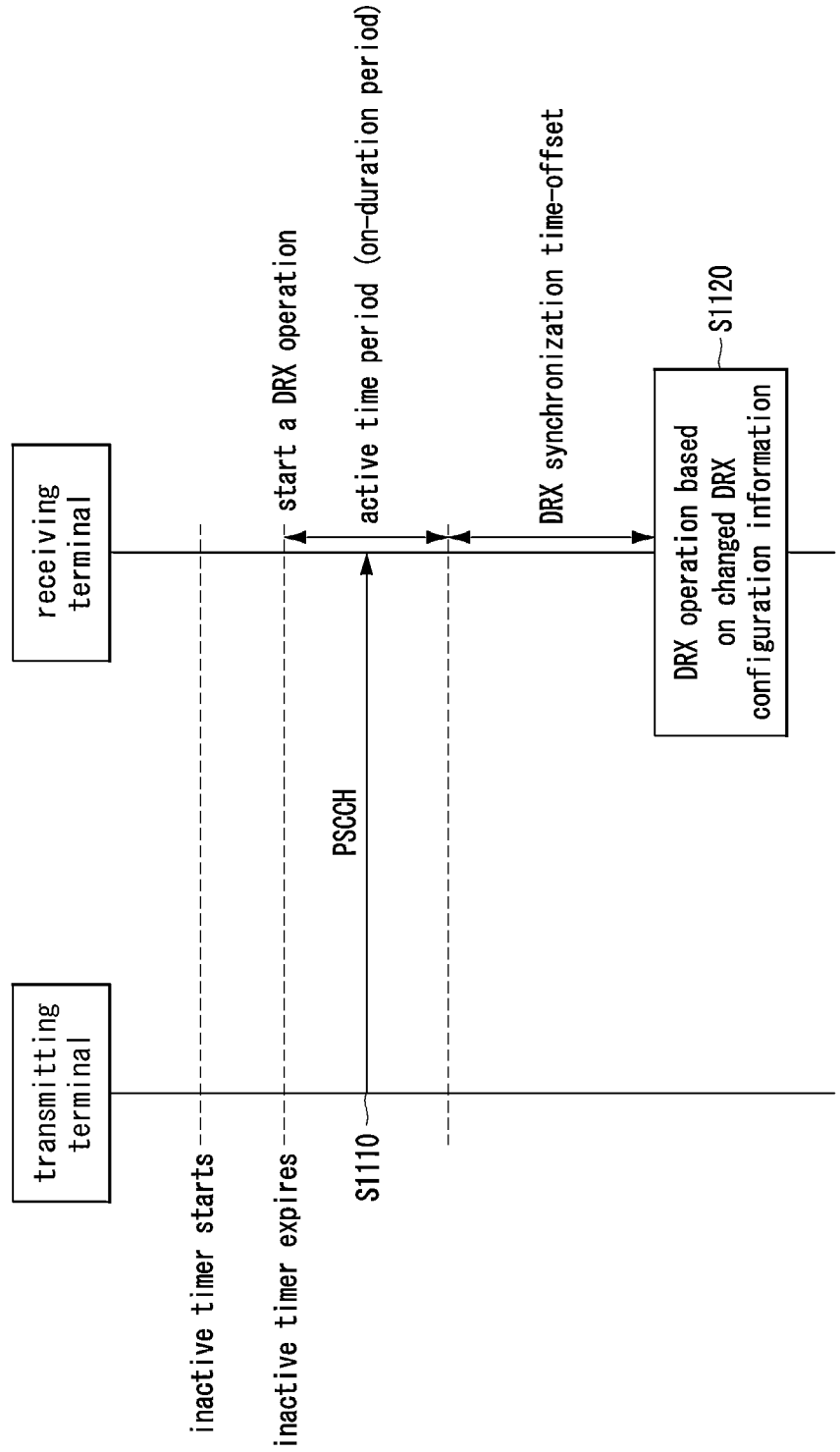
FIG. 11 is a sequence chart illustrating a fifth embodiment of a method for configuring DRX synchronization in a communication system.

FIG. 11 is a sequence chart illustrating a fifth embodiment of a method for configuring DRX synchronization in a communication system.

As shown in FIG. 11, a communication system may include a transmitting terminal and a receiving terminal. The transmitting terminal and/or the receiving terminal may start an inactive timer. If a transmission or reception operation of data between the transmitting terminal and the receiving terminal is not performed before the inactive timer expires, the receiving terminal may perform a reception operation for a PSCCH to receive DRX synchronization information. An active time period may start after the inactive timer expires. The reception operation for the PSCCH may be performed in the active time period.

The transmitting terminal may transmit the DRX synchronization information in the active time period (e.g., the first active time period after the inactive timer expires) (S1110). The DRX synchronization information may be transmitted on the PSCCH. The DRX synchronization information may include a DRX cycle and/or a DRX synchronization time-offset. The receiving terminal may receive the DRX synchronization information from the transmitting terminal, and may identify information element(s) included in the DRX synchronization information. After the DRX synchronization time-offset included in the DRX synchronization information from a reception time of the DRX synchronization information (e.g., an end time of a slot in which the DRX synchronization information is received or an end time of the active time period in which the DRX synchronization information is received), the receiving terminal may apply the changed DRX synchronization information (e.g., DRX cycle included in the changed DRX synchronization information) to perform a DRX operation (S1120).

Alternatively, the DRX synchronization information (or DRX configuration information) may be configured by higher layer signaling or system information instead of the PSCCH. In this case, the receiving terminal may apply the changed DRX configuration information (e.g., new DRX configuration information or updated DRX configuration information) to perform the DRX operation after a time indicated by preconfigured DRX synchronization information from a reception time of the PSCCH.

The DRX synchronization time-offset may be set as shown in Table 4 below. Configuration information of Table 4 may be preconfigured in terminals (e.g., transmitting terminal and receiving terminals) by higher layer signaling or system information. For example, the base station may signal configuration information of Table 4 to the terminals. After configuring Table 4, the transmitting terminal may transmit indication bits indicating one time-offset to the receiving terminal on the PSCCH.

TABLE 4

| Indication bits | DRX synchronization time-offset |
|---|---|
| 00 | Time-offset #1 |
| 01 | Time-offset #2 |
| 10 | Time-offset #3 |
| 11 | Time-offset #4 |

In Table 4, when the indication bits set to 01 are indicated through the PSCCH, the receiving terminal may apply the changed DRX configuration information (e.g., new DRX configuration information or updated DRX configuration information) after the time-offset #2 from the reception time of the PSCCH (e.g., an end time of the slot in which the PSCCH is received or an end time of the active time period in which the PSCCH is received). The time-offset may be set in units of slots, subframes, symbols, or absolute time. Alternatively, without configuring Table 4, a value of the time-offset may be directly indicated through the PSCCH. Alternatively, an application time of the changed DRX configuration information may be fixed to a specific time after the reception time of the PSCCH or a specific time after the end time of the active time period in which the PSCCH is received.

Figure 12:
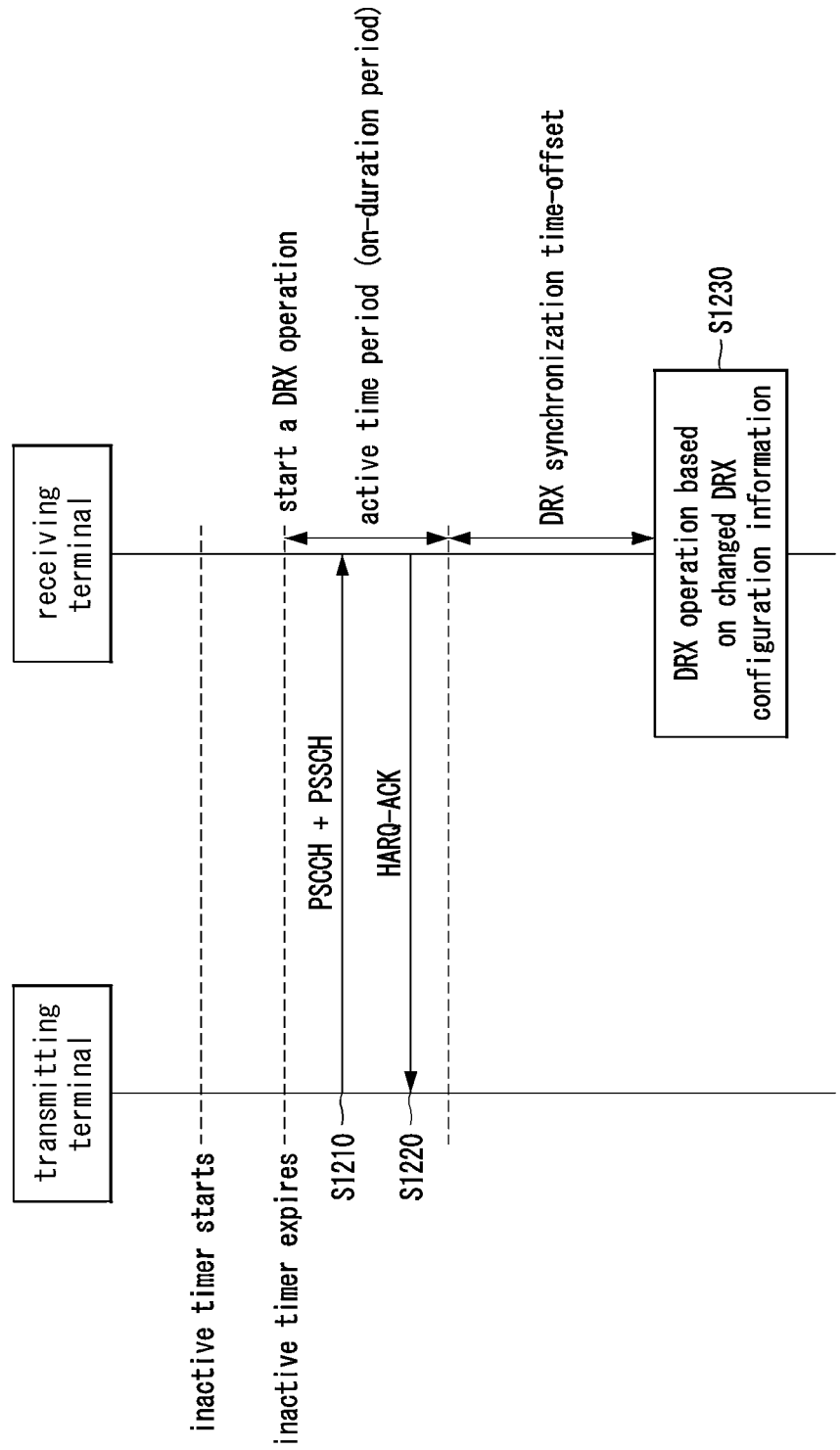
FIG. 12 is a sequence chart illustrating a sixth embodiment of a method for configuring DRX synchronization in a communication system.

FIG. 12 is a sequence chart illustrating a sixth embodiment of a method for configuring DRX synchronization in a communication system.

As shown in FIG. 12, a communication system may include a transmitting terminal and a receiving terminal. The transmitting terminal and/or the receiving terminal may start an inactive timer. If a transmission or reception operation of data between the transmitting terminal and the receiving terminal is not performed before the inactive timer expires, the receiving terminal may perform a reception operation for a PSCCH and/or a PSSCH to receive DRX synchronization information. An active time period may start after the inactive timer expires. The reception operation for the PSCCH and/or the PSSCH may be performed in the active time period.

The transmitting terminal may transmit the DRX synchronization information in the active time period (e.g., the first active time period after the inactive timer expires) (S1210). The transmitting terminal may transmit the PSCCH and the PSSCH for signaling of the DRX synchronization information. The DRX synchronization information may include a DRX cycle and/or a DRX synchronization time-offset. The receiving terminal may receive the PSCCH and the PSSCH from the transmitting terminal and may obtain the DRX synchronization information from the PSCCH and/or the PSSCH. The receiving terminal may transmit a HARQ-ACK (e.g., ACK or NACK) for the PSCCH and/or PSSCH to the transmitting terminal (S1120). The receiving terminal may transmit the HARQ-ACK to the transmitting terminal within the active time period. Alternatively, the HARQ-ACK may be transmitted at a specific time after the active time period in which the PSCCH and the PSSCH are received. The transmitting terminal may receive the HARQ-ACK (e.g., ACK or NACK) for the PSCCH and/or the PSSCH from the receiving terminal. The transmitting terminal may check whether the DRX synchronization information has been successfully received by the receiving terminal based on the HARQ-ACK. Therefore, ambiguity caused by a reception failure of the DRX synchronization information in the receiving terminal may be resolved.

After the DRX synchronization time-offset included in the DRX synchronization information from a reception time of the DRX synchronization information (e.g., an end time of a slot in which the DRX synchronization information is received or an end time of the active time period in which the DRX synchronization information is received), the receiving terminal may apply the changed DRX synchronization information (e.g., DRX cycle included in the changed DRX synchronization information) to perform a DRX operation (S1230).

Alternatively, the DRX synchronization information (or DRX configuration information) may be configured by higher layer signaling or system information instead of the PSCCH and the PSSCH. In this case, the receiving terminal may apply the changed DRX configuration information (e.g., new DRX configuration information or updated DRX configuration information) to perform the DRX operation after a time indicated by preconfigured DRX synchronization information from a reception time of the PSCCH or the PSSCH.

The DRX synchronization time-offset may be set as shown in Table 4 described above. Configuration information of Table 4 may be preconfigured in terminals (e.g., transmitting terminal and receiving terminals) by higher layer signaling or system information. For example, the base station may signal configuration information of Table 4 to the terminals. After configuring Table 4, the transmitting terminal may transmit indication bits indicating one time-offset to the receiving terminal on the PSCCH or PSSCH.

Alternatively, without configuring Table 4, a value of the time-offset may be directly indicated through the PSCCH or the PSSCH. Alternatively, an application time of the changed DRX configuration information may be fixed to a specific time after the reception time of the PSCCH (or, PSSCH) or a specific time after the end time of the active time period in which the PSCCH (or, PSSCH) is received.

Figure 13:
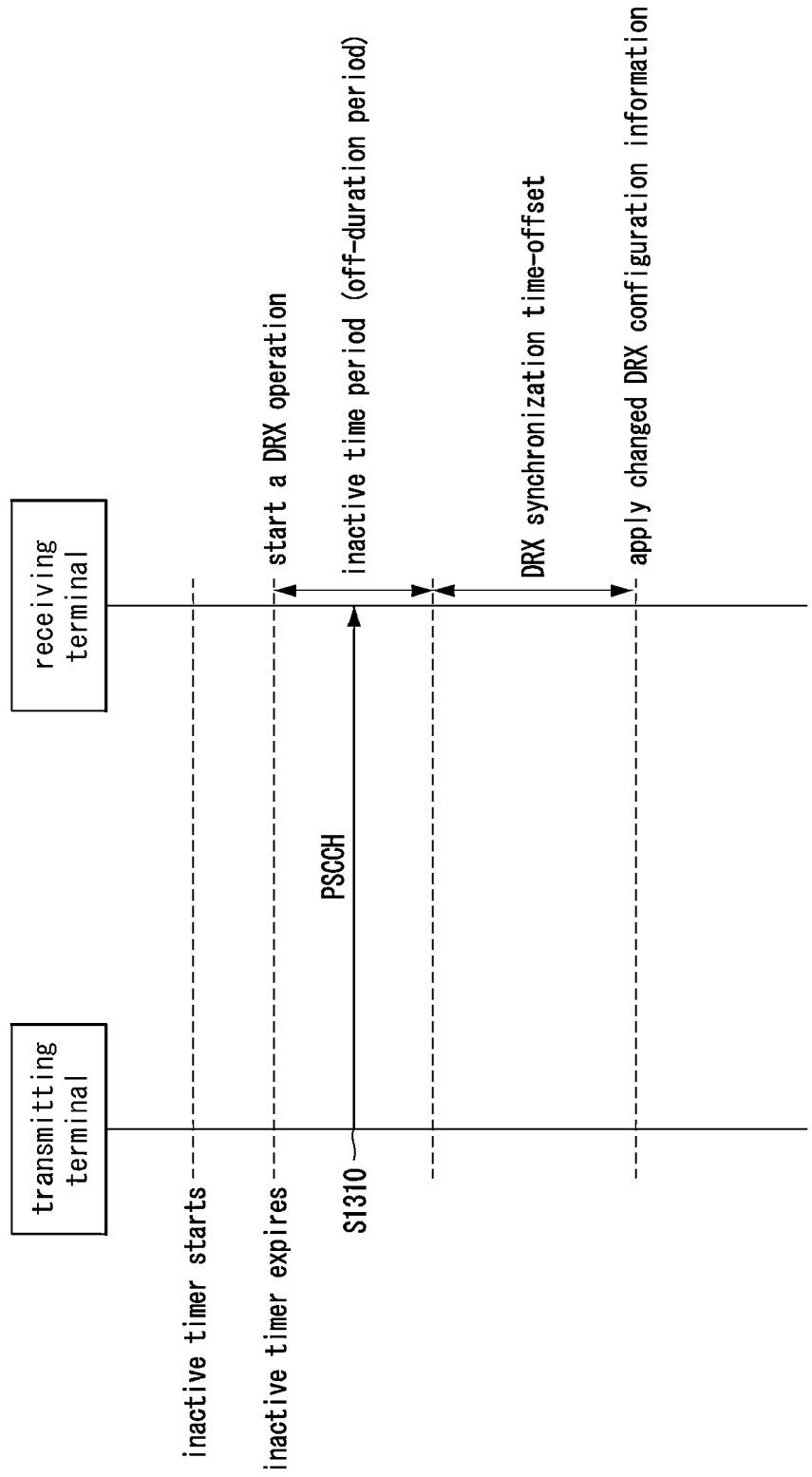
FIG. 13 is a sequence chart illustrating a seventh embodiment of a method for configuring DRX synchronization in a communication system.

FIG. 13 is a sequence chart illustrating a seventh embodiment of a method for configuring DRX synchronization in a communication system.

As shown in FIG. 13, a communication system may include a transmitting terminal and a receiving terminal. The transmitting terminal and/or the receiving terminal may start an inactive timer. If a transmission or reception operation of data between the transmitting terminal and the receiving terminal is not performed before the inactive timer expires, the receiving terminal may perform a reception operation for a PSCCH to receive DRX synchronization information. An active time period may start after the inactive timer expires. The reception operation for the PSCCH may be performed in the active time period.

The transmitting terminal may transmit the DRX synchronization information in the inactive time period (e.g., the first inactive time period after the inactive timer expires) (S1310). The DRX synchronization information may be transmitted through the PSCCH. The DRX synchronization information may include a DRX cycle and/or a DRX synchronization time-offset. The receiving terminal may receive the DRX synchronization information from the transmitting terminal and may identify information element(s) included in the DRX synchronization information. After the DRX synchronization time-offset included in the DRX synchronization information from a reception time of the DRX synchronization information (e.g., an end time of a slot in which the DRX synchronization information is received or an end time of the inactive time period in which the DRX synchronization information is received), the receiving terminal may apply the changed DRX synchronization information (e.g., DRX cycle included in the changed DRX synchronization information).

Figure 14:
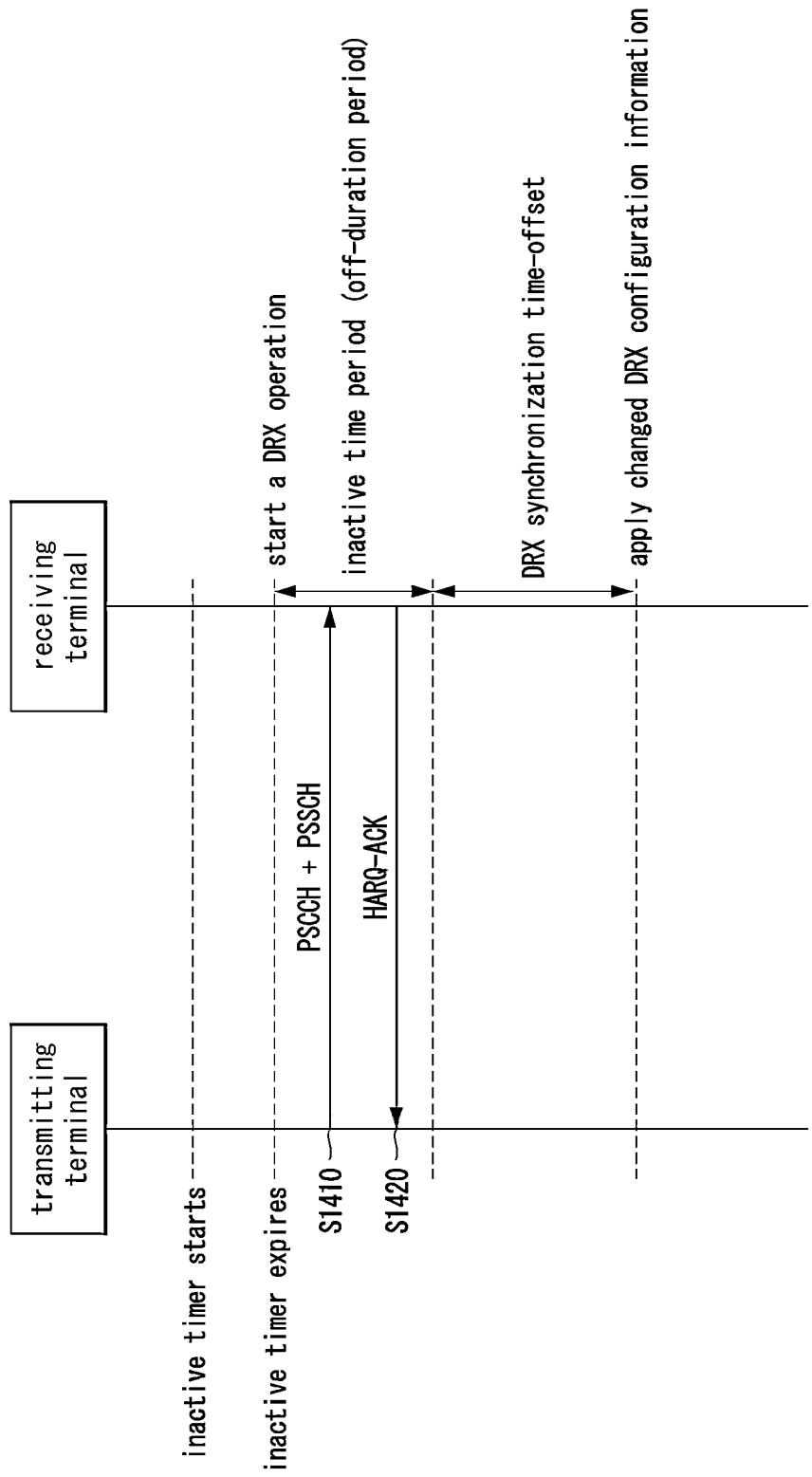
FIG. 14 is a sequence chart illustrating an eighth embodiment of a method for configuring DRX synchronization in a communication system.

FIG. 14 is a sequence chart illustrating an eighth embodiment of a method for configuring DRX synchronization in a communication system.

As shown in FIG. 14, a communication system may include a transmitting terminal and a receiving terminal. The transmitting terminal and/or the receiving terminal may start an inactive timer. If a transmission or reception operation of data between the transmitting terminal and the receiving terminal is not performed before the inactive timer expires, the receiving terminal may perform a reception operation for a PSCCH and/or a PSSCH to receive DRX synchronization information. An inactive time period may start after the inactive timer expires. The reception operation for the PSCCH and/or the PSSCH may be performed in the inactive time period.

The transmitting terminal may transmit the DRX synchronization information in the inactive time period (e.g., the first inactive time period after the inactive timer expires)

(S1410). The transmitting terminal may transmit the PSCCH and the PSSCH for signaling of the DRX synchronization information. The DRX synchronization information may include a DRX cycle and/or a DRX synchronization time-offset. The receiving terminal may receive the PSCCH and the PSSCH from the transmitting terminal and may obtain the DRX synchronization information from the PSCCH and/or the PSSCH. The receiving terminal may transmit a HARQ-ACK (e.g., ACK or NACK) for the PSCCH and/or the PSSCH to the transmitting terminal (S1420). The receiving terminal may transmit the HARQ-ACK to the transmitting terminal within the inactive time period. Alternatively, the HARQ-ACK may be transmitted at a specific time after the inactive time period in which the PSCCH and the PSSCH are received. The transmitting terminal may receive the HARQ-ACK (e.g., ACK or NACK) for the PSCCH and/or the PSSCH from the receiving terminal. The transmitting terminal may check whether the DRX synchronization information has been successfully received by the receiving terminal based on the HARQ-ACK. Therefore, ambiguity caused by a reception failure of the DRX synchronization information in the receiving terminal may be resolved.

After the DRX synchronization time-offset included in the DRX synchronization information from a reception time of the DRX synchronization information (e.g., an end time of a slot in which the DRX synchronization information is received or an end time of the inactive time period in which the DRX synchronization information is received), the receiving terminal may apply the changed DRX synchronization information (e.g., DRX cycle included in the changed DRX synchronization information).

The embodiment of FIG. 11, the embodiment of FIG. 12, the embodiment of FIG. 13, or the embodiment of FIG. 14 may be adaptively applied according to the DRX operation. For example, when an active time period occurs before an inactive time period, the embodiment of FIG. 11 or the embodiment of FIG. 12 may be applied. When an inactive time period occurs before an active time period, the embodiment of FIG. 13 or the embodiment of FIG. 14 may be applied.

The embodiments of FIGS. 11-14 may be performed to change DRX configuration or DRX synchronization between one transmitting terminal and one receiving terminal. In addition, the embodiments of FIGS. 11-14 may be applied to the embodiment of FIG. 8 or 9. In other words, the embodiments of FIGS. 11-14 may be performed to change DRX configuration or DRX synchronization between one transmitting terminal and a plurality of receiving terminals.

When one transmitting terminal communicates with a plurality of receiving terminals through a plurality of sidelinks, a DRX synchronization time-offset may be set for each of the plurality of sidelinks. In other words, the DRX synchronization time-offset may be configured SL-specifically. Alternatively, a DRX synchronization time-offset may be set for each receiving terminal (e.g., receiving terminal ID) or receiving terminal group (e.g., reception group ID). In other words, the DRX synchronization time-offset may be configured UE-specifically or group-specifically. Alternatively, the DRX synchronization time-offset may be set based on a combination of the above-described schemes.

A plurality of DRX synchronization time-offsets may be transmitted through one PSCCH or one PSSCH. In other words, a plurality of DRX synchronization time-offsets may be indicated by one SCI. The plurality of DRX synchronization time-offsets may be signaled together with one or more information elements (e.g., an ID of a receiving terminal, a receiving group, a specific groupcast, and/or a specific unicast to which each DRX synchronization time-offset is applied). For example, a source/destination L2 ID pair may be mapped to a DRX synchronization time-offset, and the DRX synchronization time-offset may be signaled together with the source/destination L2 ID pair.

The DRX synchronization time-offset may be set as a relative time-offset value for a specific time (e.g., an end time of the inactive timer, the end time of the active time period in which the PSCCH is transmitted, or the end time of the inactive time period in which the PSCCH is transmitted). When a plurality of DRX synchronization time-offsets are simultaneously operated, relative DRX synchronization time-offsets may be set based on one DRX synchronization time-offset. For example, when three DRX synchronization time-offsets (i.e., time-offset #1, time-offset #2, and time-offset #3) are operated, the time-offset #1 may be set based on the end time of the active time period or inactive time period in which the PSCCH is transmitted, the time-offset #2 may be set based on the time-offset #1, and the time-offset #3 may be set based on the time-offset #2. Alternatively, a time of a specific time resource may be directly indicated.

In the above-described embodiments, a time period (or resource period) for PSCCH monitoring may be configured in each terminal by higher layer signaling or system information. Each terminal may perform a PSCCH monitoring operation in the configured time period (or configured resource period). A combination, extension, and/or change of the above-described embodiments may be utilized for change of DRX configuration information (e.g., DRX synchronization information).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those having ordinary skill in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions, and alterations may be made herein without departing from the scope of the present disclosure.

The invention claimed is:

1. A method for operating a first terminal in a wireless communication system, the method comprising:
receiving a first message including sidelink discontinuous reception (SL DRX) configuration;
receiving a second message from a second terminal using physical sidelink control channel (PSCCH) in an inactive time;
obtaining a time offset from the second message; and
performing SL DRX operation based on the time offset, wherein the inactive time is determined based on an inactive timer being not running, wherein the inactive timer is included in the SL DRX configuration, and wherein the SL DRX configuration including the time offset is configured per information including an identifier (ID) of the first terminal.

2. The method of claim 1, further comprising obtaining sidelink control information (SCI) from the PSCCH, wherein the SCI includes DRX synchronization information, and the DRX synchronization information includes information on a DRX cycle, and wherein the time offset indicating a start time of the DRX cycle.

3. The method of claim 2, further comprising performing a DRX operation according to the DRX cycle at the start time indicated by the DRX synchronization information.

4. The method of claim 2, wherein the DRX cycle starts after the time offset from a reception time of the PSCCH, an end time of a slot in which the PSCCH is received, or an end time of the inactive time in which the PSCCH is received.

5. The method of claim 2, wherein a plurality of time offsets are configured by higher layer signaling or system information, and the DRX synchronization information indicates one time offset among the plurality of time offsets.

6. The method of claim 2, wherein the time offset is set user equipment (UE)-specifically, group-specifically, or sidelink (SL)-specifically.

7. The method of claim 2, wherein the SCI includes information indicating an SCI type, and the SCI type is classified into an SCI type 1-A for scheduling data transmission and an SCI type 1-B for signaling DRX synchronization information.

8. The method of claim 1, further comprising:

performing a reception operation for a physical sidelink shared channel (PSSCH) associated with the PSCCH; and transmitting a hybrid automatic repeat request-acknowledgement (HARQ-ACK) for the PSSCH to the second terminal.

9. The method of claim 8, wherein the reception operation for the PSSCH and the transmission operation of the HARQ-ACK are performed within the inactive time.

10. A first terminal in a wireless communication system, the first terminal, the first terminal comprising:

a processor; and a memory storing one or more instructions executable by the processor, wherein the one or more instructions are executed to:

receive a first message including sidelink discontinuous reception (SL DRX) configuration;

receiving a second message from a second terminal using physical sidelink control channel (PSCCH) in an inactive time;

obtain a time offset from the second message; and perform SL DRX operation based on the time offset, wherein the inactive time is determined based on an inactive timer being not running, wherein the inactive timer is included in the SL DRX configuration, and wherein the SL DRX configuration including the time offset is configured per information including an identifier (ID) of the first terminal.

11. The first terminal of claim 10, wherein the instructions are further executed to obtain sidelink control information (SCI) from the PSCCH, wherein the SCI includes DRX synchronization information, and the DRX synchronization information includes information on a DRX cycle, and wherein the time offset indicating a start time of the DRX cycle.

12. The first terminal of claim 11, wherein the one or more instructions are further executed to perform a DRX operation according to the DRX cycle at the start time indicated by the DRX synchronization information.

13. The first terminal of claim 11, wherein the DRX cycle starts after the time offset from a reception time of the PSCCH, an end time of a slot in which the PSCCH is received, or an end time of the inactive time period in which the PSCCH is received.

14. The first terminal of claim 11, wherein a plurality of time offsets are configured by higher layer signaling or system information, and the DRX synchronization information indicates one time offset among the plurality of time offsets.

15. The first terminal of claim 11, wherein the time offset is set user equipment (UE)-specifically, group-specifically, or sidelink (SL)-specifically.

* * * * *